US007689924B1

(12) United States Patent  
Schneider

(10) Patent No.: US 7,689,924 B1  
(45) Date of Patent: Mar. 30, 2010

(54) LINK ANNOTATION FOR KEYBOARD NAVIGATION

(75) Inventor: Fritz Schneider, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1187 days.

(21) Appl. No.: 10/823,050

(22) Filed: Apr. 12, 2004

Related U.S. Application Data

(63) Continuation of application No. 10/809,972, filed on Mar. 26, 2004, now abandoned.

(51) Int. Cl.
  G06F 17/00   (2006.01)
  G06F 3/00    (2006.01)
  G06F 3/048   (2006.01)
  G06F 15/16   (2006.01)

(52) U.S. Cl. .................. 715/764; 715/207; 715/221; 715/224; 715/247; 715/256; 715/719; 715/723; 715/728; 715/733; 715/760; 715/802; 715/856; 715/858; 709/207; 709/204; 709/205

(58) Field of Classification Search .............. 715/501.1, 715/513, 728, 738, 748, 749, 760, 802, 764, 715/207, 221, 224, 247, 256, 719, 723, 733, 715/856, 858; 709/207, 204, 208, 205
See application file for complete search history.

(56) References Cited

U.S. PATENT DOCUMENTS

| | | | | |
|---|---|---|---|---|
| 4,931,950 A | * | 6/1990 | Isle et al. ....................... 706/11 |
| 6,085,161 A | * | 7/2000 | MacKenty et al. ........... 704/270 |
| 6,552,739 B1 | * | 4/2003 | Reed ............................ 715/854 |
| 6,560,640 B2 | * | 5/2003 | Smethers ...................... 709/219 |
| 6,643,651 B1 | * | 11/2003 | Pearsall ......................... 707/10 |
| 6,728,681 B2 | * | 4/2004 | Whitham ....................... 704/275 |
| 6,763,496 B1 | * | 7/2004 | Hennings et al. .......... 715/501.1 |
| 6,781,571 B2 | * | 8/2004 | Bates et al. ................... 345/159 |
| 6,788,316 B1 | * | 9/2004 | Ma et al. ...................... 715/760 |
| 6,954,896 B1 | * | 10/2005 | Dodrill et al. ................ 715/234 |
| 7,103,315 B2 | * | 9/2006 | Wilkinson .................. 455/41.2 |
| 7,168,034 B2 | * | 1/2007 | Hennings et al. ............ 715/205 |
| 7,171,364 B2 | * | 1/2007 | Kouzu .......................... 704/271 |
| 7,174,513 B1 | * | 2/2007 | Nickum ....................... 715/738 |
| 7,181,679 B1 | * | 2/2007 | Taylor ......................... 715/234 |
| 7,210,093 B1 | * | 4/2007 | Dutta .......................... 715/210 |
| 7,260,529 B1 | * | 8/2007 | Lengen ........................ 704/235 |
| 7,289,964 B1 | * | 10/2007 | Bowman-Amuah ............ 705/1 |
| 7,305,624 B1 | * | 12/2007 | Siegel .......................... 715/738 |
| 7,406,658 B2 | * | 7/2008 | Brassell et al. ............... 715/239 |
| 2002/0026524 A1 | * | 2/2002 | Dharap ........................ 709/236 |
| 2002/0035613 A1 | * | 3/2002 | Hirayama .................... 709/218 |

(Continued)

OTHER PUBLICATIONS

U.S. Appl. No. 10/809,972, Schneider.

*Primary Examiner*—Dennis-Doon Chow
*Assistant Examiner*—Linh K Pham
(74) *Attorney, Agent, or Firm*—Harrity & Harrity, LLP

(57) ABSTRACT

A computer navigation system and method has one or more interactive links displayed on a display connected to a computer appliance, and one or more visual linktags associated with individual ones of the one or more interactive links, the linktags displaying one or more numbers, characters or symbols, the system enabled to initiate an interactive link in the display upon user input of one of the numbers, characters or symbols in a linktag.

36 Claims, 6 Drawing Sheets

U.S. PATENT DOCUMENTS

| | | | |
|---|---|---|---|
| 2002/0156870 A1* | 10/2002 | Boroumand et al. | 709/219 |
| 2003/0014261 A1* | 1/2003 | Kageyama | 704/275 |
| 2003/0055870 A1* | 3/2003 | Smethers | 709/203 |
| 2003/0067484 A1* | 4/2003 | Moir | 345/747 |
| 2003/0208472 A1* | 11/2003 | Pham | 707/2 |
| 2003/0229900 A1* | 12/2003 | Reisman | 725/87 |
| 2004/0015353 A1* | 1/2004 | Kim et al. | 704/246 |
| 2004/0064790 A1* | 4/2004 | Aoki et al. | 715/513 |
| 2004/0216053 A1* | 10/2004 | Sponheim et al. | 715/760 |
| 2005/0195221 A1* | 9/2005 | Berger et al. | 345/660 |

* cited by examiner

LINK ANNOTATION FOR KEYBOARD NAVIGATION

CROSS-REFERENCE TO RELATED DOCUMENTS

The present application is a continuation application of patent application Ser. No. 10/809,972 entitled "Link Annotation for Keyboard Navigation", filed Mar. 26, 2004, now abandoned, which is incorporated in its entirety by reference.

FIELD OF THE INVENTION

The present invention is in the area of web page navigation, and pertains more particularly to a system, method and apparatus for displaying, selecting, and managing navigation without the use of a computer pointing device such as a mouse or a touchpad.

BACKGROUND OF THE INVENTION

In his 1963 MIT PhD thesis, Ivan Sutherland in Sketchpad, a man-machine graphical communication system, first demonstrated direct manipulation of graphical objects where visible objects on the screen are directly manipulated with a pointing device. Sketchpad supported the manipulation of objects using a light-pen, including grabbing objects, moving objects and changing object size. The mouse pointer device was later developed at the Stanford Research Laboratory in 1965 to be a cheap replacement for light-pens. Since then, many other types of pointing devices have been invented, including but not limited to touch pads, trackballs, and even natural language and speech recognition of commands for pointer functions such as cursor movement.

Pointing and clicking with a mouse or other sort of pointer device is not a very efficient way to initiate links to navigate to web pages. To accomplish pointing and clicking it is necessary to move the mouse to a small target, such as a link icon on the screen, and then to click a mouse button to initiate the link to navigate to the corresponding link address. The time it takes to navigate to the desired web page is at least in part controlled by the time it takes to reach to the mouse from the keyboard, move a cursor to the link icon with the mouse, click (press a button on the mouse), and move the hand back to the keyboard.

Many web browsers provide an ability to tab around links on a page. That is, when viewing a web page with links, pressing the tab key causes focus to move to interactive elements such as buttons, links, form fields, etc. on the page, and continued pressing of the tab key moves focus from one interactive element to another until all have been highlighted. Focus is typically shown with a dotted box around the interactive element, but may be shown in other ways, depending in some cases on the nature of the element. Pressing the enter key while an interactive element is focused causes the interactive element to be activated. In the case of a link, pressing the enter key causes the link to be followed as if the interactive element were clicked with a pointing device such as a mouse.

Mozilla, an open source Internet client suite designed for standards compliance, speed, and portability, has an ability to give links on the page focus by typing the text part of the link, referred to hereafter as link text. When the user is looking at a page and begins typing, Mozilla finds the first link on the page that contains the text the user is typing, highlights the letters the user has typed, and gives the link text focus. The user can then press the enter key to navigate to the link target. There are several downsides to this approach, however.

Firstly, if there are many links on the page with similar-starting link text, then the user will have to type a lot of link text in order to highlight the one the user wants to use. Secondly, this method skips images, because images are often used as links instead of text. That is, if there are links that have an image instead of link text, the user can't navigate easily. In this case the user must tab or use a pointing device such as a mouse.

In addition to the above, it is known to the inventor that there is an "accesskey" feature in HTML that allows a page author to specify an "accelerator key" for a link, and in some browsers, also for form fields. The specification for such a key in HTML is: <ahref="http://www.example.com"accesskey="e">mylink</a>.

When users press the accelerator key in a page (OS and/or browser-dependent, usually ALT or similar) and presses the access key (in this case "e"), it activates the link.

There are several problems with the accesskey feature in HTML. Firstly, authors must manually add this attribute to their HTML elements. Secondly, most of the time, for the user, it is not clear what the accelerator key is for a link even if there is an accelerator key set. The page author must go out of his way to use style sheets or something similar in order to show the user what the access key is for a link in the page. Thirdly, it is not at all clear how one could show an access key for links that are, for example, images.

What is clearly needed is a method and apparatus for selecting and activating links, including any and all types of interactive links, without the use of a pointing device.

SUMMARY OF THE INVENTION

In an embodiment of the present invention computer navigation system is provided, comprising one or more interactive links displayed on a display connected to a computer appliance, and one or more visual linktags associated with individual ones of the one or more interactive links. The linktags display one or more numbers, characters or symbols, and the system is enabled to initiate an interactive link in the display upon user input of one of the numbers, characters or symbols in a linktag.

In some embodiments the user input may be vocal, and in some embodiments the user input may be by selecting a key on a keyboard communicating with the computer appliance, the key annotated with the letter, symbol or number in a linktag. Also in some embodiments the visual linktags are associated with interactive links by being displayed adjacent to the associated interactive link. The association of linktags with links may be one-to-one and unique, such that no two links have the same linktag.

In some embodiments the display of linktags may be initiated and terminated by one or more predefined keystrokes, or by one or more voice commands, such that keyboard and voice controlled navigation may be toggled on and off. Linktags, when toggled off, may be saved to be redisplayed without re-creation if toggled on again. In some cases linktags may be automatically displayed associated with interactive links in a display each time an interactive display is loaded on the computer appliance.

In embodiments of the invention there are several ways that functionality for display and use of linktags may be provided. For example, through an operating system executed by the computer appliance, through a web browser application, by addition to an existing web browser application through a plug-in, and through javascript code, among other possibilities. HTML layering may be used in combination with javascript to provide linktags.

In some embodiments interactive links displayed, when initiated, may launch applications to be executed on the computer appliance. Also in some embodiments, interactive links displayed, when initiated, may cause navigation to a destination defined in a universal resource locator.

In another aspect of the invention a method for navigation using an interactive display of a computer appliance is provided, including acts of displaying one or more visual linktags associated with individual ones of one or more interactive links in the interactive display, the linktags displaying one or more numbers, characters or symbols, and initiating an interactive link in the display by input of one of the numbers, characters or symbols in a linktag.

In some embodiments of the method the input may be vocal. Also in some embodiments the input may be by selecting a key on a keyboard communicating with the computer appliance, the key annotated with the number, character or symbol in a linktag. In some embodiments the linktags may be associated with interactive links by being displayed adjacent to the associated interactive link. Also the association of linktags with links may be one-to-one and unique, such that no two links have the same linktag.

In some embodiments of the method there may be an act for initiation and termination of linktags by one or more predefined keystrokes, or by one or more predefined voice commands, such that keyboard-controlled and voice-controlled navigation may be toggled on and off. In some cases linktags, when toggled off, may be saved to be redisplayed if toggled on again. Also in some embodiments linktags may automatically be displayed associated with interactive links in a display each time an interactive display is loaded on the computer appliance.

There are a variety of ways in the method that linktag display and functionality may be accomplished. Functionality for display and use of linktags may be provided through an operating system executed by the computer appliance, for example, through a web browser application, by an existing web browser application through a plug-in, through javascript code, or through HTML layering in combination with javascript code, among other possibilities.

In some cases in the method the interactive links displayed, when initiated, launch applications to be executed on the computer appliance, while in other cases the interactive links displayed, when initiated, initiate navigation defined in a universal resource locator (URL).

In yet another aspect of the invention a machine-readable medium having stored thereon a set of instructions that cause a machine to perform a method using an interactive display of a computer appliance having a keyboard is provided, the method comprising displaying one or more visual linktags associated with individual ones of one or more interactive links in the interactive display, the linktags displaying one or more numbers, characters or symbols, and initiating an interactive link in the display by input of one of the numbers, characters or symbols in a linktag.

In some embodiments of the recorded method the input may be vocal. Also in some embodiments the input may be by selecting a key on a keyboard communicating with the computer appliance, the key annotated with the number, character or symbol in a linktag. In some embodiments the linktags may be associated with interactive links by being displayed adjacent to the associated interactive link. Also the association of linktags with links may be one-to-one and unique, such that no two links have the same linktag.

In some embodiments of the recorded method there may be an act for initiation and termination of linktags by one or more predefined keystrokes, or by one or more predefined voice commands, such that keyboard-controlled and voice-controlled navigation may be toggled on and off. In some cases linktags, when toggled off, may be saved to be redisplayed if toggled on again. Also in some embodiments linktags may automatically be displayed associated with interactive links in a display each time an interactive display is loaded on the computer appliance.

There are a variety of ways in the recorded method that linktag display and functionality may be accomplished. Functionality for display and use of linktags may be provided through an operating system executed by the computer appliance, for example, through a web browser application, by an existing web browser application through a plug-in, through javascript code, or through HTML layering in combination with javascript code, among other possibilities.

In some cases in the recorded method the interactive links displayed, when initiated, launch applications to be executed on the computer appliance, while in other cases the interactive links displayed, when initiated, may cause navigation defined in a universal resource locator (URL).

In embodiments of the present invention, described in enabling detail below, for the first time a system and method is provided for activation and navigation by such as keyboard activation of interactive icons and navigation links and voice activation of interactive icons and navigation links.

BRIEF DESCRIPTION OF THE DRAWING FIGURES

DESCRIPTION OF THE PREFERRED EMBODIMENTS

Embodiments of the invention described below may find applicability, for example, with hypertext documents in an HTML format such as used on the World Wide Web, among other applications. However, it should be appreciated that other hypertext document formats may be used as well as alternative browser or display applications.

In general, a hypertext document may include any collection of information, whether stored in one or more specific files on a computer, in one or more records in a database, and so on. Hypertext documents typically include text, but may also include various multimedia objects such as images, sound, animation, video clips, and so on. The person of ordinary skill in the art will understand the subject of hypertext, as the concept and details of hypertext are notoriously well-known, and form a part of every basic text on Internet technology. Therefore further details of hypertext are not repeated here.

An internal hypertext link typically includes a fragment URL that refers to an anchor within the same document as the definition. The anchor is typically designated by a "#" followed by an anchor token. An internal hypertext link definition points to the same resource as the current document, although this resource information may or may not be included in the URL specified in the definition.

For the purpose of this invention, no differentiation needs to be made as to whether a hypertext link is an internal hypertext link or an external hypertext link. Both sorts may be used in embodiments of the present invention.

Hardware Environment

Figure 1:
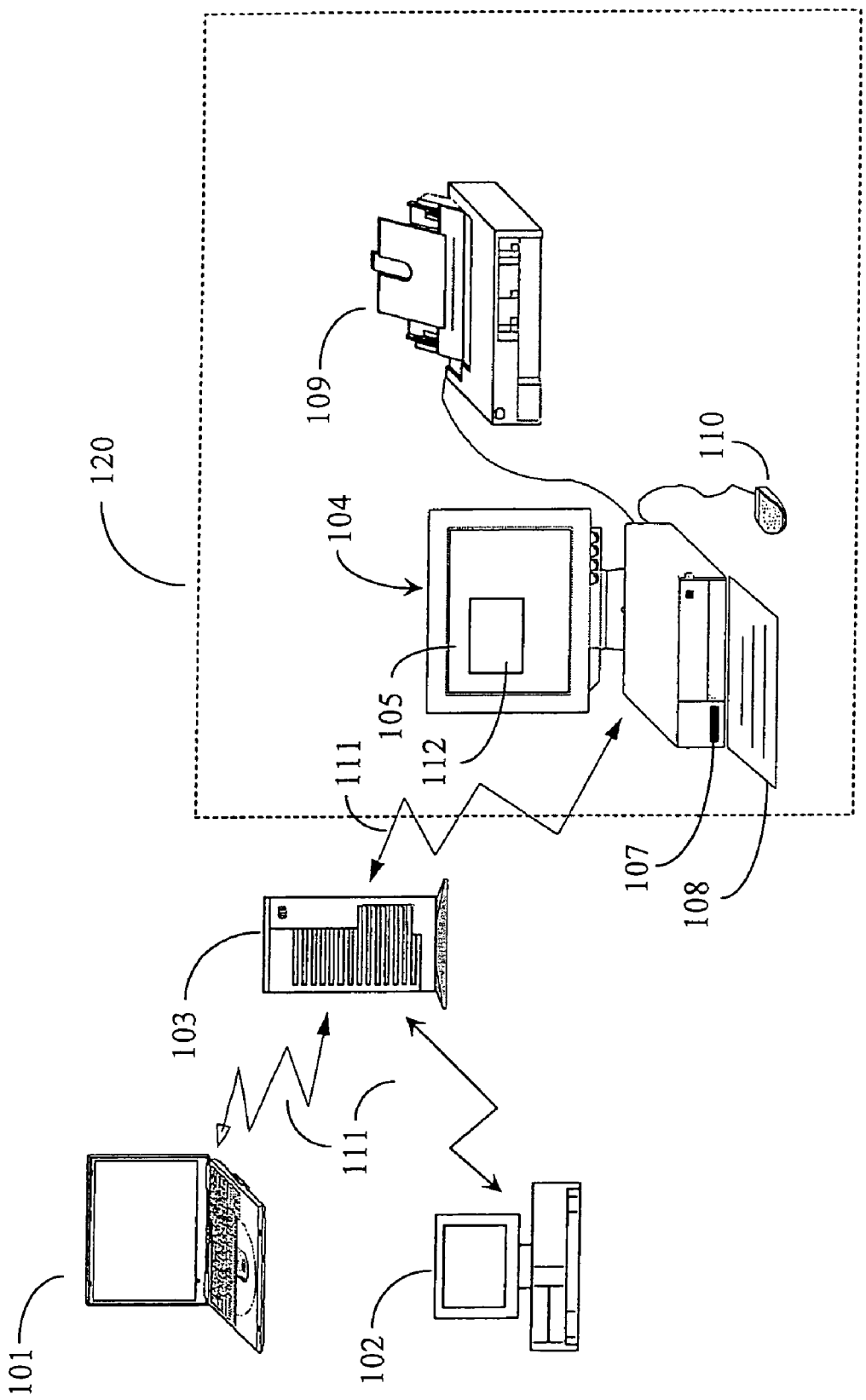
FIG. 1 is a block diagram of a computer architecture useful in practicing the invention in one embodiment.

Referring now to the several figures, wherein like numbers denote like parts throughout the several views, a computer system 120 enhanced according to an embodiment of the invention is illustrated in FIG. 1. Computer system 120 may be a networked computer system including one or more client computer systems 101, 102 and 104, for example desktop or personal computers, workstations, etc. coupled to a server system 103 through a network 111. Network 111 may represent many types of networked interconnection, including but not limited to local-area, wide-area, wireless, and public networks such as the Internet. Moreover, any number of computers, servers, and other devices may be networked through network 111. Furthermore, it should be appreciated that various embodiments of the invention may be utilized as well by stand-alone computers and associated devices.

Computer system 104, which may be similar to or quite different from computer systems 101, 102, may include a processor such as a microprocessor (not shown); a number of peripheral components such as a computer display 105, which may be a CRT, an LCD display or other display device; storage devices 107 such as but not limited to a hard, floppy, and/or CD-ROM disk drives; a printer 109; and various input devices and pointing devices such as a mouse 110 and keyboard 108, among others. Computer system 104 may operate under the control of an operating system, and execute various computer software applications, programs, objects, modules, etc. For example, one such computer software application is a hypertext browser, for which a window 112 is displayed on computer display 105. Moreover, various applications, programs, objects, modules, and so on, may also execute on one or more processors in server 103 or other computer systems 101, 102, that is to say in a distributed computing environment.

In general, the logic executed to implement illustrated embodiments of the invention, whether implemented as hardware, firmware or software, and/or as part of an operating system or a specific application, program, object, module or sequence of instructions are referred to herein as computer programs. The computer programs typically comprise instructions which, when read and executed by one or more processors in the devices or systems in networked computer system 120, cause those devices or systems to perform the steps or elements embodying the various aspects of the invention. Moreover, while the invention may and hereinafter is described in the context of fully functioning computer systems, those skilled in the art will appreciate that the various embodiments of the invention described may be distributed as a program product in a variety of forms, and that the embodiments of the invention apply equally regardless of the particular type of signal-bearing media used to actually carry out the distribution. Examples of signal bearing media include but are not limited to recordable type media such as volatile and non-volatile memory devices, floppy disks, hard disk drives, CD-ROM's, DVD's, and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Logic Environment

Figure 2:
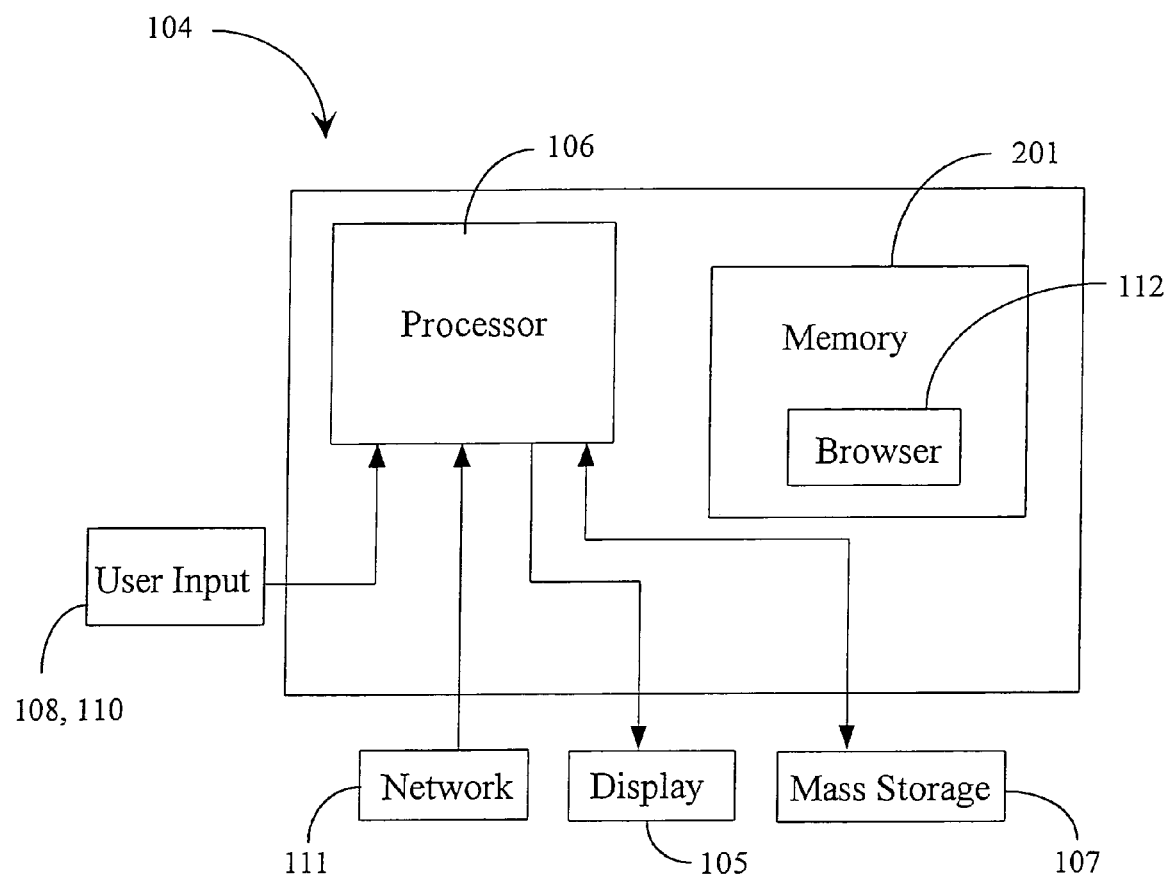
FIG. 2 is a block diagram of an exemplary architecture for a computer appliance in FIG. 1.

FIG. 2 illustrates one suitable software environment for computer system 104 consistent with an embodiment of the invention. A processor 106, referred to in the description of FIG. 1 but not shown in the figure, is illustrated as coupled to a memory 201 as well as to several inputs and outputs. For example, user input may be received by processor 106, such as from pointing device 110 and keyboard 108, among others. Additional information may be passed between computer system 104 and other computer systems in networked computer system 120 via network 111. Additional information may be stored to and/or received from mass storage 107. Processor 106 also outputs display data to display 105. It should be appreciated that computer system 104 includes suitable interfaces, typically bus structures, between processor 106 and each of components 11, 105, 107, 108, 110 and 201 as is well known in the art.

A browser 112 is illustrated as logic resident in memory 201. However, it should be appreciated that browser 112 may be stored on network 111 or mass storage 107 prior to start-up, and in addition, may have various components that are resident at different times in any of memory 201, mass storage 107, network 111, or within registers and/or caches in processor 106.

Browser 112 processes hypertext documents for viewing and manages an interactive user interface. The hypertext documents may be retrieved from mass storage 107 or over network 111, for example, through an Internet connection. Moreover, hypertext documents may be cached from time to time in the memory 201 and/or mass storage 107 once they are viewed to accelerate subsequent viewing by a user. It should be appreciated that other software environments may be utilized in the alternative.

Figure 3:
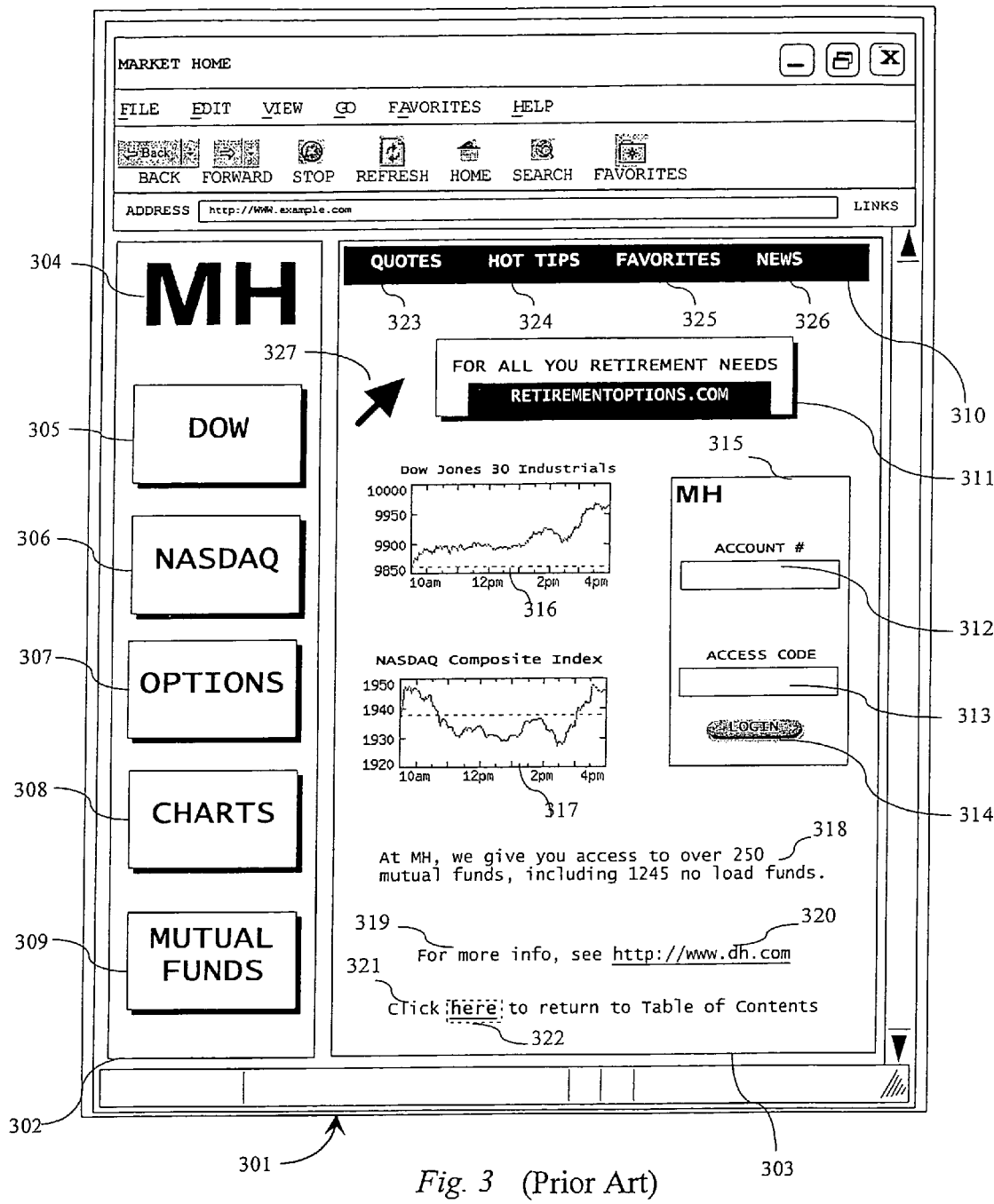
FIG. 3 is a representation of an exemplary web page displayed on a monitor of FIG. 1, as the page might appear in the prior art.

FIG. 3 illustrates an exemplary web page 301 served from an exemplary stock brokerage Internet web site as the page might appear when rendered on a display by a modern Internet browser, such as Microsoft's Internet Explorer, Netscape's Navigator, or Mozilla's Firebird. Web page 301 is exemplary of many web pages that implement frames, and includes two adjacent frames 302 and 303. A logo graphic object 304 is displayed at the top of frame 302, which additionally includes a plurality of links with overlaying graphic objects, including a DOW link 305, a NASDAQ link 306, an OPTIONS link 307, a CHARTS link 308, and a MUTUAL FUNDS link 309.

A horizontal group of links 310 is rendered at the top of frame 303, and includes a QUOTES link 323, a HOT TIPS link 324, a FAVORITES link 325, and a NEWS link 326. An advertisement banner 311 is displayed just below the horizontal group of links. Frame 303 also includes a pair of graphic objects, including a DOW chart 316 and a NASDAQ chart 317. A set of user input objects is adjacent to DOW chart 316 within a graphic object 315, including an ACCOUNT # input box 312, an ACCESS CODE input box 313, and a LOGIN button 314. In addition to the foregoing objects, frame 303 also includes text links 320 and 322 (shown with focus), and text objects 318, 319 and 321.

Moving a cursor, shown as arrow 327, by use of a mouse or other pointing device, over an interactive element, and then clicking the appropriate mouse button causes navigation to a link address associated with the interactive element. As described above, in at least one browser known in the art, it is also possible to invoke an interactive element associated with text by typing the text, and it is also known to enable focus using the tab key on the keyboard, and to tab from one to another interactive element in a predetermined order, and to select an element by the Enter key on the keyboard.

In an embodiment of the present invention, when browser 112 loads the illustrative web page 301, JavaScript may be inserted into the page such that when the control (Ctrl) key or some other predefined trigger key at the keyboard is pressed, or some other predefined input is provided, links on the page may be annotated with a small tag referred to herein as a linktag.

Figure 4:
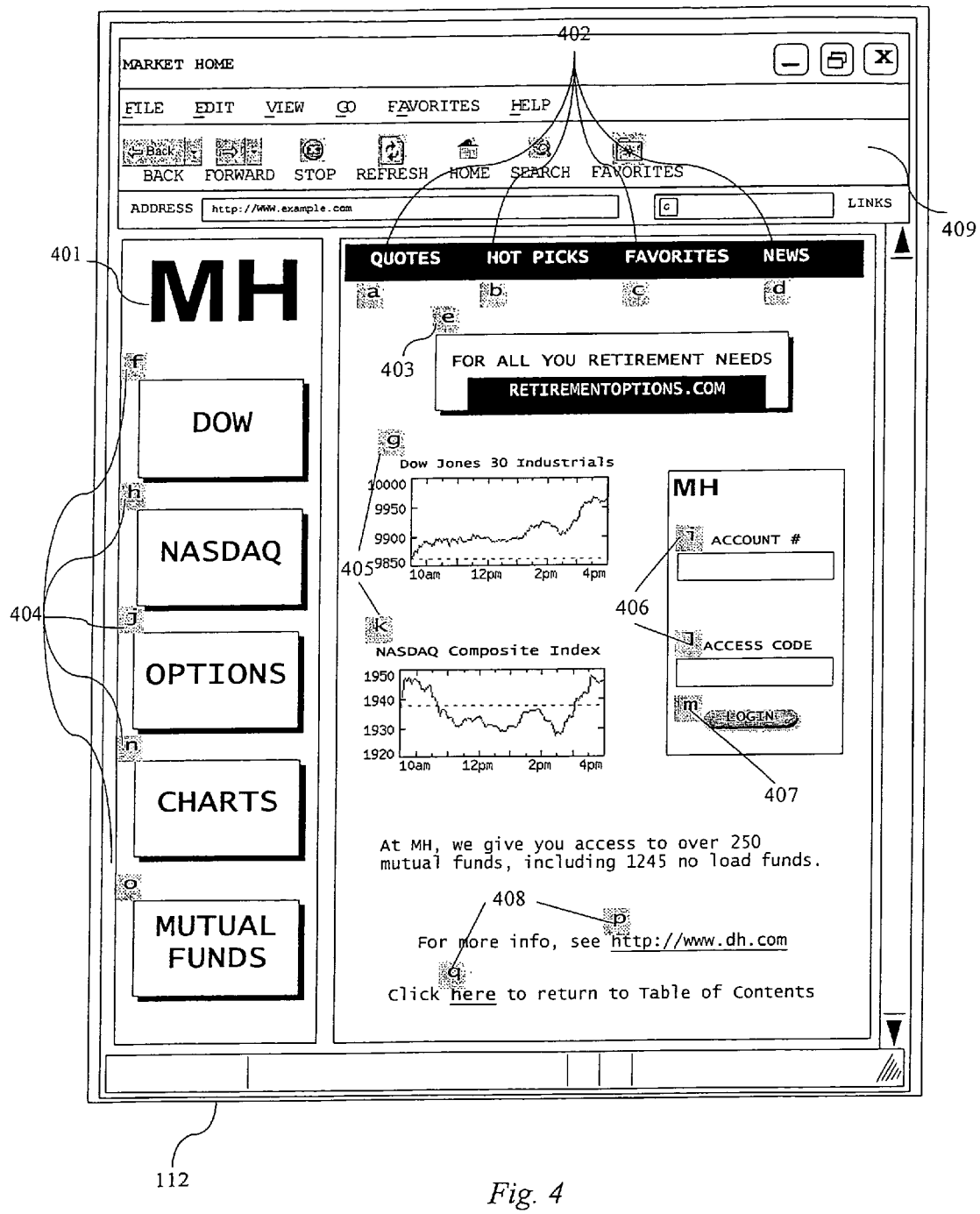
FIG. 4 is an illustrative example of the web page display of FIG. 3 with annotated keyboard link icons according to an embodiment of the present invention.

FIG. 4 is a view of the exemplary web page of FIG. 3, showing linktags 402, 403, 404, 405, 406, 407, and 408 adjacent to each interactive link, each linktag being a letter, number, punctuation mark, word, phrase, symbol and so on, each of which may be associated with a key on the keyboard. When the associated key on the keyboard is pressed, the link will be activated as if the associated interactive element was selected by use of a pointer device. Pressing another predefined trigger key, such as the Control key again, may be used to hide the annotations and return the keyboard to its normal state. It will be apparent to the skilled artisan that it is not required that all interactive links be annotated with linktags. The annotation may be applied to any set or subset of interactive links in a page as well.

Further to the above, in another embodiment of the invention, voice activation may be provided such that a user may simply say the letter, number, word, phrase or symbol in a linktag, and the system will activate the indicated link. Also further to the above, there is more than one way that a linktag may be displayed, and more than one way that functionality for linktags may be implemented. The use of linktags in embodiments of the invention is not limited to web pages, for example, although use in web pages is one application. Linktags may also be implemented, for example, associated with icons on a desktop, such that voice or keyboard input invoking a number, character or symbol in a linktag may be used to initiate execution of an application, for example, from its icon on the desktop.

The embodiment with linktags described above with reference to FIG. 4 illustrates the following interactive elements: text links 402, 408; banner graphic object 403; graphic objects 404, 405; user input objects 406; and button graphic object 407. It should be noted that since logo graphic 401 is not an interactive element, so it does not have an associated linktag.

In some cases there may be more links in a page than there are possible keys on the keyboard. In this case the JavaScript may annotate N interactive elements at a time, and rotate to the next N each time the control key is pressed. N in this case may be how many keyboard characters are being used. For example, N=52 if the letters a-z and A-Z are being used for the linktags. Similarly, N=64 if the letters a-z and A-Z, the numbers 0-9, and the special characters '!' and '-' are being used for the linktags.

In the exemplary embodiment shown by FIG. 4, the annotations are in the form of a small square w/gray background and black text positioned just above and to the left of each link, except for elements 402, which are below the links. The positioning/color/and so on may vary widely in different embodiments. In some embodiments, for example, background color and text color of linktags may be automatically adjusted according to background colors in a web page. Configuration tools may also be provided for a user to adjust appearance of link tags. In some cases, when linktags might be offscreen, they might be automatically adjusted in position to show onscreen.

The order in which keys can be assigned to linktags may vary widely in different embodiments. In some cases keys may be assigned in order of which keys are easiest to type. For example, assigning in an order such as asdfjkl; . . . could be used to minimize user keystrokes reach.

Figure 5:
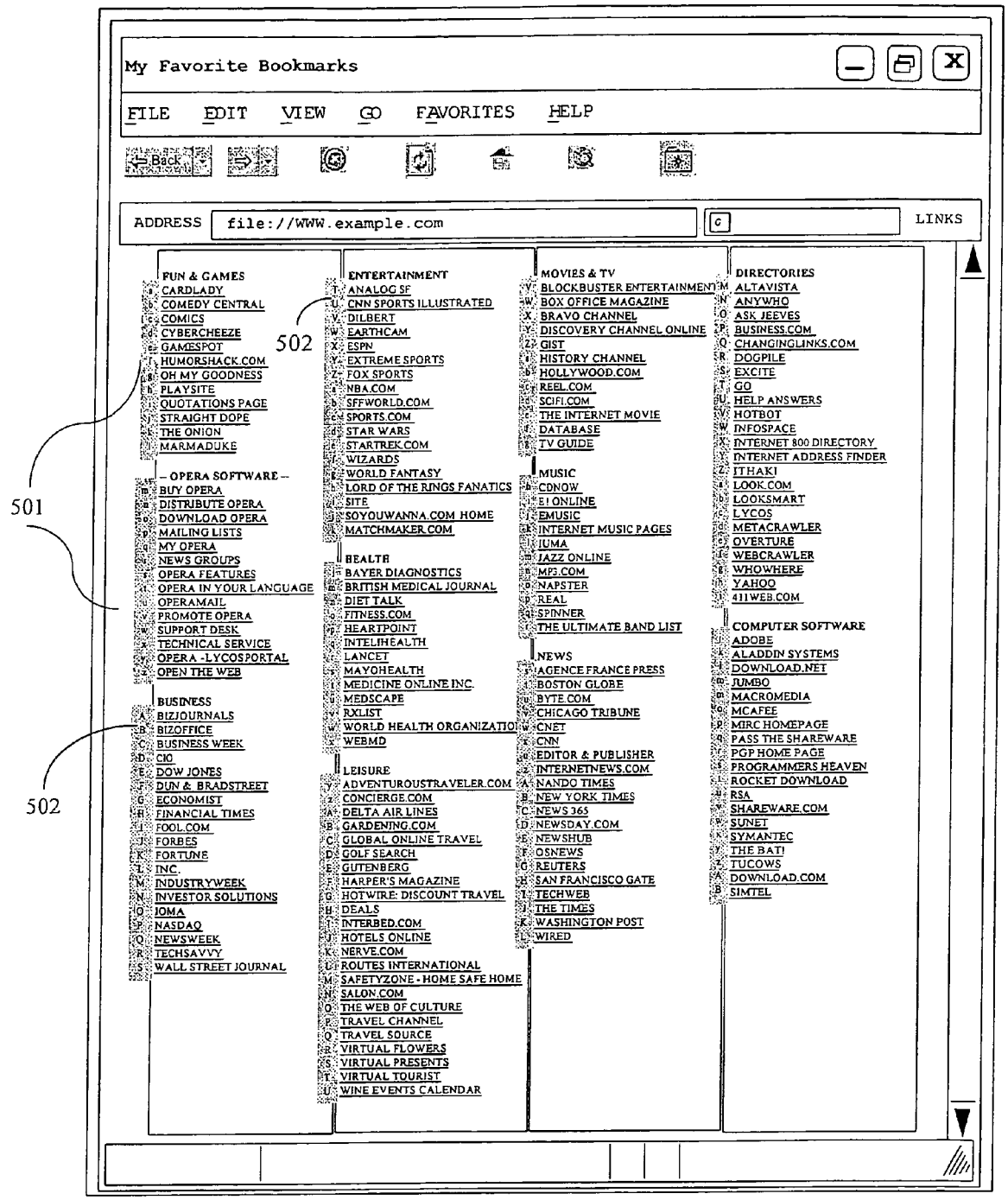
FIG. 5 illustrates another example of a web page according to another embodiment of the invention.

FIG. 5 illustrates an exemplary web page where there are more links in the page than there are possible keys on a keyboard which may be used for associating with linktags. In this example, the characters a . . . z and A . . . Z (lowercase and uppercase) are used. Linktags 501 a . . . z are assigned to the first 26 links. Linktags 502 A . . . Z are assigned to the next 26 links. The sequence of a . . . z, A . . . Z is then repeated for the next 52 linktags.

An alternative to annotating N links at a time each with a single character is to use a multi-character linktags to annotate links after the single letters are used. In this case a prefix-free code such as a trie data structure may be used; otherwise typing the first part of a multi-letter linktag could trigger a single-letter linktag.

Linktag annotations in various embodiments of the invention may be implemented as an external JavaScript that is attached to the HTML (in a hypertext embodiment of the invention) of a page as soon as it is loaded. When the Ctrl key or some other predefined trigger key is pressed, the JavaScript may iterate over the links in the page, and for each one create a new HTML layer or span, layer, div or similar element, color it appropriately, insert the next unused key in it, figure out the coordinate location of the link on the page, and place the new layer above and to the left of this location, or in another appropriate position in relation to the interactive element associated. The placement takes into account the browser border so the process won't, for example, try to place something off-screen where the linktag would not be visible. In one embodiment, while link annotation is active, whenever a key is pressed the JavaScript checks to see if a link was assigned to that key, and if so, causes the browser to follow the link associated with the linktag. In this embodiment, when the control key is pressed again the HTML layers may be hidden so the linktags don't have to be re-created if link annotations are activated again for the same web page.

In one embodiment linktags may be displayed and rendered active through combined use of javascript and HTML layering. In HTML one might use Cascading Style Sheet Syntax or the <LAYER> tag, known to the skilled artisan, to specify layers of HTML. The javascript code may be used to move layers, hide layers, and to change the order in which layers overlap, and this functionality may be used to implement linktags in embodiments of the invention.

Figure 6:
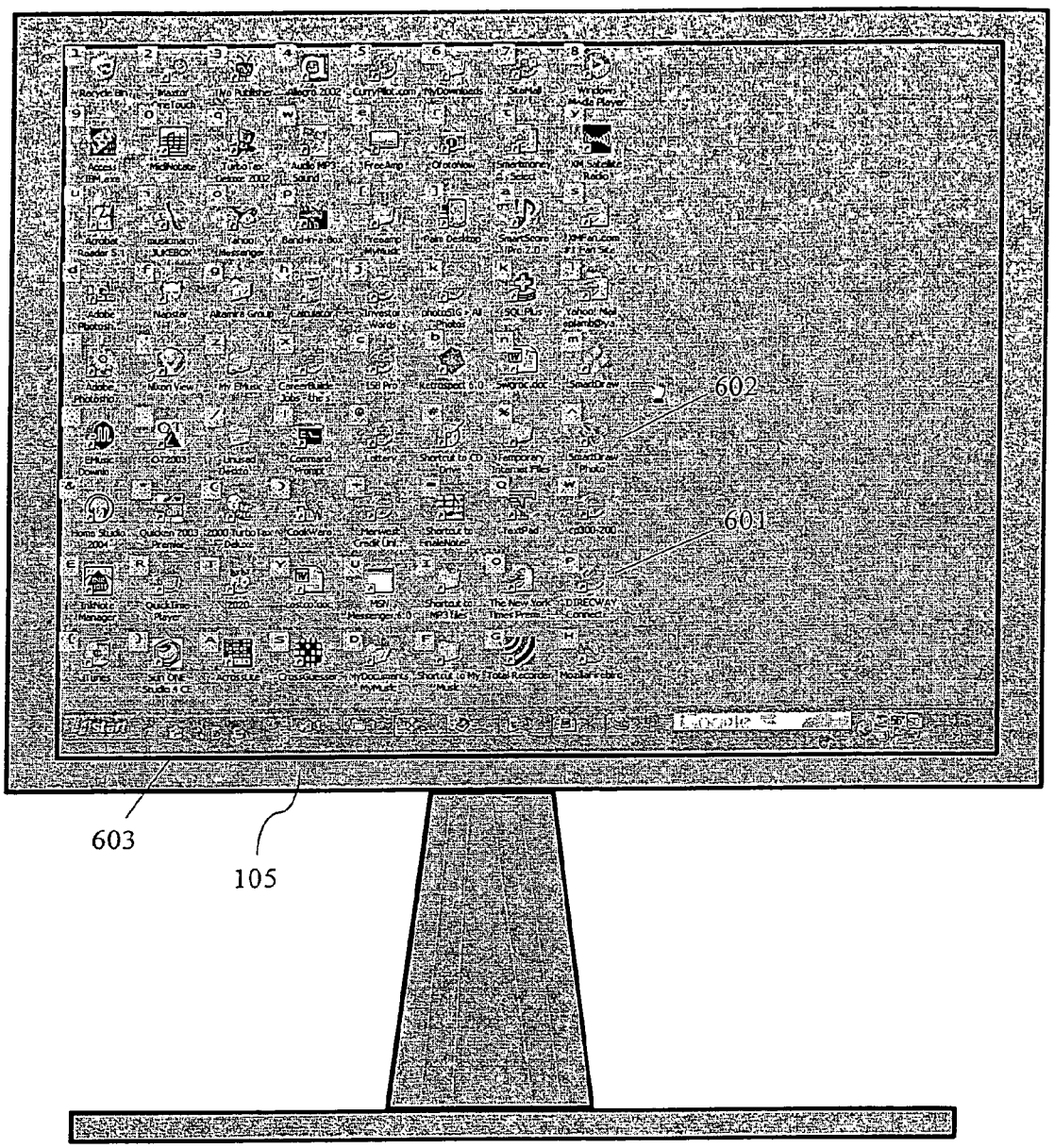
FIG. 6 illustrates another example of an embodiment of the invention, in this case applied to a window manager for an operating system.

FIG. 6 illustrates yet another embodiment of the invention, applied to an operating system window manager, which the skilled artisan will recognize as a "desktop", referred to briefly above. In FIG. 6 display 105 is shown with a desktop 603 as it would appear when rendered on a modern multiple-tiled windows interface. In this embodiment, some interactive elements 601 when selected would launch an Internet browser and cause navigation to an associated web page. Other interactive elements 602 might launch other types of computer applications. In both cases, the assignment of linktags as described in embodiments of the present invention would allow for navigation without the use of a pointing device such as a mouse or touchpad.

It will be apparent to the skilled artisan that considerable alteration may be made in various details of the embodiments described above without departing from the spirit and scope of the invention. For example, how various embodiments are implemented is not limiting to the invention. The present invention might be coded in C++ and operate pervasively on a computer appliance as a part of an operating system for example, or the present invention might operate with JavaScript, for example, so linktags would work no matter what web browser is used. In some cases linktags may function only as a part of or in conjunction with a web browser application, and linktag functionality may be provided with a browser or added as a plug-in, for example. Likewise, the fact that links are annotated when a control key is pressed and released is not limiting either. An embodiment of this invention could easily have the browser automatically annotate links on a page as soon as the web page is loaded. For these and other reasons the invention should be accorded the breadth of the claims that follow.

What is claimed is:

1. A computer navigation system having a microprocessor, comprising:
   one or more interactive links displayed on a display connected to a computer device; and
   one or more visual linktags associated with particular ones of the one or more interactive links, the one or more visual linktags displaying one or more numbers, characters or symbols,
   where the system is enabled to initiate a particular interactive link of the one or more interactive links in the display upon receiving user input of a particular one of the numbers, characters or symbols associated with a particular visual linktag, where the particular visual linktag is separate from and displayed simultaneously with the particular interactive link,
   where the one or more numbers, characters or symbols are automatically assigned to the particular ones of one or more interactive links in response to the display containing the one or more interactive links being provided to the computer device,
   where display of the one or more visual linktags is initiated by a predefined input and terminated, while the one or more interactive links are displayed, by the predefined input, such that keyboard or voice-controlled navigation is toggled on and off by the predefined input, and
   where the one or more visual linktags, if toggled off, are saved and, if toggled on again, re-displayed without re-creation.

2. The system of claim 1, where the user input includes vocal input.

3. The system of claim 1, where receiving the user input includes receiving selection of a key on a keyboard.

4. The system of claim 1, where the one or more visual linktags are associated with particular ones of the one or more interactive links by being displayed adjacent to the particular ones of the one or more interactive links.

5. The system of claim 1, where no two ones of the one or more interactive links are associated with a same one of the one or more visual linktags.

6. The system of claim 1, where functionality for display and use of linktags is provided through an operating system executed by the computer device.

7. The system of claim 1, where functionality for display and use of linktags is provided through a web browser application.

8. The system of claim 7, where functionality for display and use of linktags is added to an existing web browser application through a plug-in.

9. The system of claim 1, where functionality for display or use of linktags is provided through javascript code.

10. The system of claim 9, where HTML layering is used in combination with javascript to provide linktags.

11. The system of claim 1, where the one or more interactive links displayed, when initiated, launch applications to be executed on the computer device.

12. The system of claim 1, where the one or more interactive links displayed, when initiated, initiate navigation to a destination defined in a universal resource locator.

13. A method performed by a computer device, the method comprising:
   displaying, using a processor associated with the computer device, one or more visual linktags associated with particular ones of one or more interactive links in the interactive display, the one or more visual linktags displaying numbers, characters or symbols separate from, and simultaneously with, particular ones of the one or more interactive links;
   automatically assigning, using the processor, the particular ones of the one or more numbers, characters or symbols to the particular ones of the one or more interactive links in response to the interactive display containing the one or more interactive links being provided to the computer device;
   initiating, using the processor, a particular one of the one or more interactive links, in response to receiving input of the particular one of the one or more numbers, characters or symbols displayed separate from, and simultaneously with, the particular one of the one or more interactive links,
   where display of the one or more visual linktags is initiated by a predefined input and terminated, while the one or more interactive links are displayed, by the predefined input, such that keyboard or voice-controlled navigation is toggled on and off by the predefined input, and
   where the one or more visual linktags, if toggled off, are saved and, if toggled on again, re-displayed without re-creation.

14. The method of claim 13, where receiving the user input includes receiving vocal input.

15. The method of claim 13, where receiving the user input includes receiving selection of a key on a keyboard.

16. The method of claim 13, where the one or more visual linktags are associated with particular ones of the one or more interactive links by being displayed adjacent to the particular ones of the one or more interactive links.

17. The method of claim 13, where no two ones of the one or more interactive links are associated with a same one of the one or more visual linktags.

18. The method of claim 13, where functionality for display and use of linktags is provided through an operating system executed by the computer appliance.

19. The method of claim 13, where functionality for display and use of linktags is provided through a web browser application.

20. The method of claim 19, where functionality for display and use of linktags is added to an existing web browser application through a plug-in.

21. The method of claim 13, where functionality for display or use of linktags is provided through javascript code.

22. The method of claim 21, where HTML layering is used in combination with javascript to provide linktags.

23. The method of claim 13, where the interactive links displayed, when initiated, launch applications to be executed on the computer device.

24. The method of claim 13, where the interactive links displayed, when initiated, cause navigation defined in a universal resource locator (URL).

25. A storage device having stored thereon a set of instructions executable by one or more processors, the storage device comprising:
  one or more instructions to display one or more visual linktags associated with particular ones of one or more interactive links in the interactive display, the one or more visual linktags displaying numbers, characters or symbols separate from, and simultaneously with, particular ones of the one or more interactive links;
  one or more instructions to automatically assign particular ones of the numbers, characters or symbols to particular ones of the one or more interactive links in response to the interactive display containing the one or more interactive links being provided to a computer device;
  one or more instructions to initiate a particular one of the one or more interactive links associated with a particular one of the one or more visual linktags in response to receiving input of a particular one of the one or more numbers, characters or symbols displayed separate from, and simultaneously with, the particular one of the one or more interactive links; and
  where display of the one or more visual linktags is initiated by a predefined input and terminated, while the one or more interactive links are displayed, by the predefined input, such that keyboard or voice-controlled navigation is toggled on and off by the predefined input, and
  where the one or more visual linktags, if toggled off, are saved and, if toggled on again re-displayed without re-creation.

26. The storage device of claim 25, where the receiving user input includes receiving vocal input.

27. The storage device of claim 25, where receiving the user input includes receiving selection of a key on a keyboard.

28. The storage device of claim 25, where the linktags are associated with interactive links by being displayed adjacent to the associated interactive link.

29. The storage device of claim 25, where no two ones of the one or more interactive links include a same one of the one or more visual linktags.

30. The storage device of claim 25, where functionality for display and use of linktags is provided through an operating system executed by the computer device.

31. The storage device of claim 25, where functionality for display and use of linktags is provided through a web browser application.

32. The storage device of claim 31, where functionality for display and use of linktags is added to an existing web browser application through a plug-in.

33. The storage device of claim 25, where functionality for display or use of linktags is provided through javascript code.

34. The storage device of claim 33, where HTML layering is used in combination with javascript to provide linktags.

35. The storage device of claim 25, where the interactive links displayed, when initiated, launch applications to be executed on the computer device.

36. The storage device of claim 25, where the interactive links displayed, when activated, cause navigation defined in a universal resource locator (URL).

* * * * *